(12) United States Patent
Johnson

(10) Patent No.: US 6,474,522 B1
(45) Date of Patent: Nov. 5, 2002

(54) BUMPER RECEIVER BRACKET DEVICE

(75) Inventor: Donald O. Johnson, Menomonie, WI (US)

(73) Assignee: Polymer Recovery Systems, Eau Claire, WI (US)

( * ) Notice: Subject to any disclaimer, the term of this patent is extended or adjusted under 35 U.S.C. 154(b) by 0 days.

(21) Appl. No.: 09/846,501

(22) Filed: May 2, 2001

Related U.S. Application Data

(60) Provisional application No. 60/277,811, filed on Mar. 22, 2001.

(51) Int. Cl.[7] .................................................. B60R 9/00
(52) U.S. Cl. ...................... 224/515; 224/514; 280/491.5
(58) Field of Search ................................. 224/512, 514, 224/515; 280/416.1, 491.5, 511

(56) References Cited

U.S. PATENT DOCUMENTS

| 4,318,501 | A |   | 3/1982  | Graber   |           |
|-----------|---|---|---------|----------|-----------|
| 4,411,580 | A | * | 10/1983 | Kelly    | 414/462   |
| 4,413,761 | A | * | 11/1983 | Angel    | 211/86.01 |
| 4,676,413 | A |   | 6/1987  | Began et al. |       |
| 4,815,638 | A |   | 3/1989  | Hutyra   |           |
| 5,219,105 | A | * | 6/1993  | Kravitz  | 224/500   |
| 5,337,932 | A |   | 8/1994  | Griewahn |           |
| D363,695  | S | * | 10/1995 | Sargent  | D12/317   |
| 5,615,814 | A | * | 4/1997  | Dechant  | 224/282   |
| 5,702,118 | A |   | 12/1997 | Hanson et al. |      |
| 5,810,231 | A |   | 9/1998  | Kravitz  |           |
| 6,010,143 | A |   | 1/2000  | Stein    |           |
| 6,354,286 | B1| * | 3/2002  | Davis    | 126/25 R  |

* cited by examiner

Primary Examiner—Stephen K. Cronin
(74) Attorney, Agent, or Firm—Tipton L. Randall

(57) ABSTRACT

A receiver bracket for mounting to a square or rectangular bumper of a recreational or similar vehicle. The receiver bracket is designed to accept various racks or other accessories of limited weight, with a maximum of about 200 pounds. The receiver bracket is highly symmetrical, allowing mounting of the square tube either below or above the supporting bumper in a horizontal orientation. Alternatively, the receiving bracket can be mounted to the bumper with the square tubing in a vertical orientation.

10 Claims, 5 Drawing Sheets

BUMPER RECEIVER BRACKET DEVICE

CROSS-REFERENCE TO RELATED APPLICATIONS, IF ANY

This application claims the benefit under 35 U.S.C. §119 (e) of co-pending provisional application Serial No. 60/277, 811, filed Mar. 22, 2001. application Ser. No. 60/277,881 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention.

The present invention relates to a receiver bracket device. More particularly, the receiver bracket device mounts to a vehicle bumper.

2. Background Information.

There is a large demand for carrier frame devices that can be mounted to a vehicle for transporting various smaller items, such as bicycles, strollers, mopeds, camping gear, etc. Most often the carrier frame is mounted to the vehicle frame for added strength. Alternatively, the carrier frame can be mounted to the vehicle bumper where lighter weight loads are involved. Some examples of bumper mounting devices have been granted patents.

Garber, in U.S. Pat. No. 4,318,501, describes bumper mounting brackets with tubular posts sized to receive the legs of the carrier rack. The posts can be held on the bumper with bumper hangers having various construction. The hanger construction of FIG. 2 and in FIGS. 6–9 show the hanger encircles the square bumper.

In U.S. Pat. No. 4,676,413, Began et al. disclose a bicycle carrier for mounting to the frame of a vehicle. The frame mounting brackets of FIGS. 2 and 3 include a square tube sleeve fastened to a J-shaped outer bracket that is bolted to an inner bracket. The inner and outer bracket parts each have opposing hook ends that clamp to the frame of the vehicle, as seen in FIG. 2.

Hutyra, in U.S. Pat. No. 4,815,638, describes a moped carrier that mounts to the bumper of an RV. A coupling member has a hollow rectangular member with a pair of coupling bars and connecting plate for fastening the assembly to the bumper, as shown in FIG. 3.

In U.S. Pat. No. 5,337,932, Griewahn discloses a bicycle rack that is secured to a square bumper by bolting together two plates with four bolts, as shown in FIG. 5. The tubing of the rack is welded to the two plates to maintain the position of the rack relative to the bumper.

Hanson et al.,in U.S. Pat. No. 5,702,118, describe a step bumper hitch with a receiver box. The hitch bolts to the bumper of a vehicle and has a draw bar receiver part that accepts a square draw bar. The ball of the hitch can be positioned in one of two locations with the hitch fastened to the bumper.

In U.S. Pat. No. 5,810,231, Kravitz discloses a bicycle carrier rack with a pair of mounting brackets that bolt to the bumper of a vehicle. The bracket has a supporting structure that extends a square tube to accept the rack held at a distance from the bumper.

U.S. Pat. No. 6,010,143 by Stein describes hitch receiver clamps that are used to prevent vibration between a receiver hitch and a hitch ball insert. The devices also can be used to extend the tube inserted into a receiver hitch and reinforce the connection there between.

Applicant has invented a bumper receiver bracket that can be attached to a variety of vehicle bumpers. In addition, the bracket device can be attached in a variety of orientations, allowing for use of carrier frames of diverse structure with the same bumper receiver bracket device.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention, as defined by the appended claims.

SUMMARY OF THE INVENTION

The invention is directed to a receiver bracket for mounting to the square or rectangular bumper of a recreational or similar vehicle. The receiver bracket is designed to accept various racks or other accessories of limited weight, with a maximum of about 200 pounds. The receiver bracket includes a length of two-inch open ended square receiver tubing secured on one side to one side of a flat plate, wider than the square tubing. The square tubing has a pair of aligned apertures for pinning an inserted accessory portion. The flat plate has pairs of apertures on each side of the square tubing, each pair of apertures positioned on each side of the attached square tubing. Each pair of apertures is sized to accept the threaded ends of an U-shaped rod. The U-shaped rods secure the receiver bracket to a rectangular bumper by encircling the bumper and tightening threaded fasteners on the two threaded end rods to hold the flat plate member against the rectangular bumper. The receiver bracket is highly symmetrical, allowing for mounting of the square receiver tube either below or above the supporting bumper with the square receiver tubing in a horizontal orientation. Alternatively, the receiver bracket can be mounted to the bumper with the square receiver tubing in a vertical orientation.

DESCRIPTION OF THE EMBODIMENTS

| Nomenclature | |
|---|---|
| 10 | Receiver Bracket Device |
| 15 | Square Tubing Receiver Member |
| 20 | Open Ends of Receiver Member |
| 25 | Flat Plate Member |
| 30 | Pair of Spaced Apart Apertures |
| 32 | Threaded Ends of Rod Members |
| 35 | U-Shaped Rod Members |
| 40 | Threaded Fasteners for Rod Members |
| 45 | L-Shaped Plate Member |
| 50 | Aligned Apertures in Tubing Member |
| B | Bumper of Vehicle |
| R | Carrier Rack Device |

Construction

Figure 1:
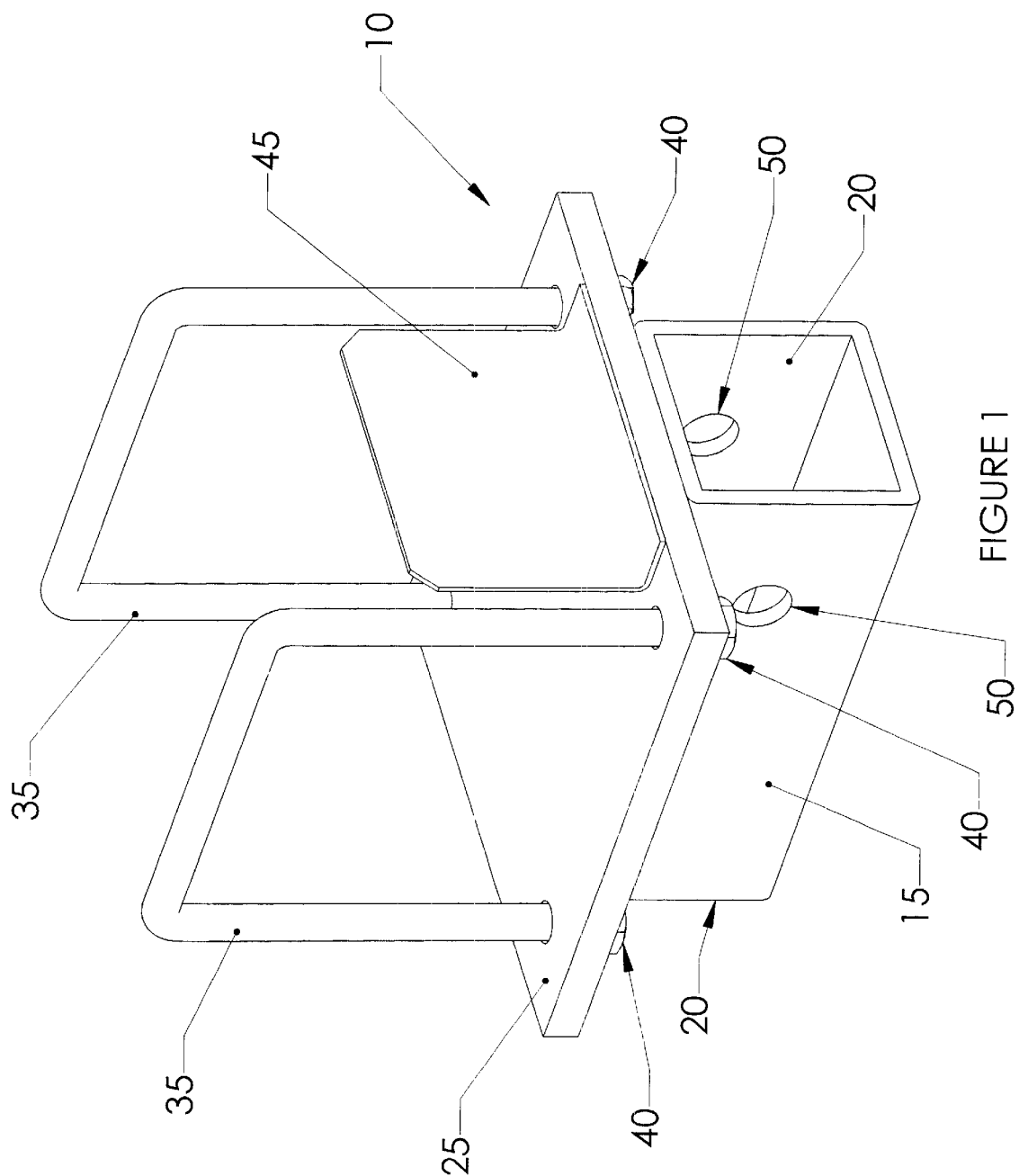
FIG. 1 is a perspective elevational view of the receiver bracket device of the present invention.
Figure 2:
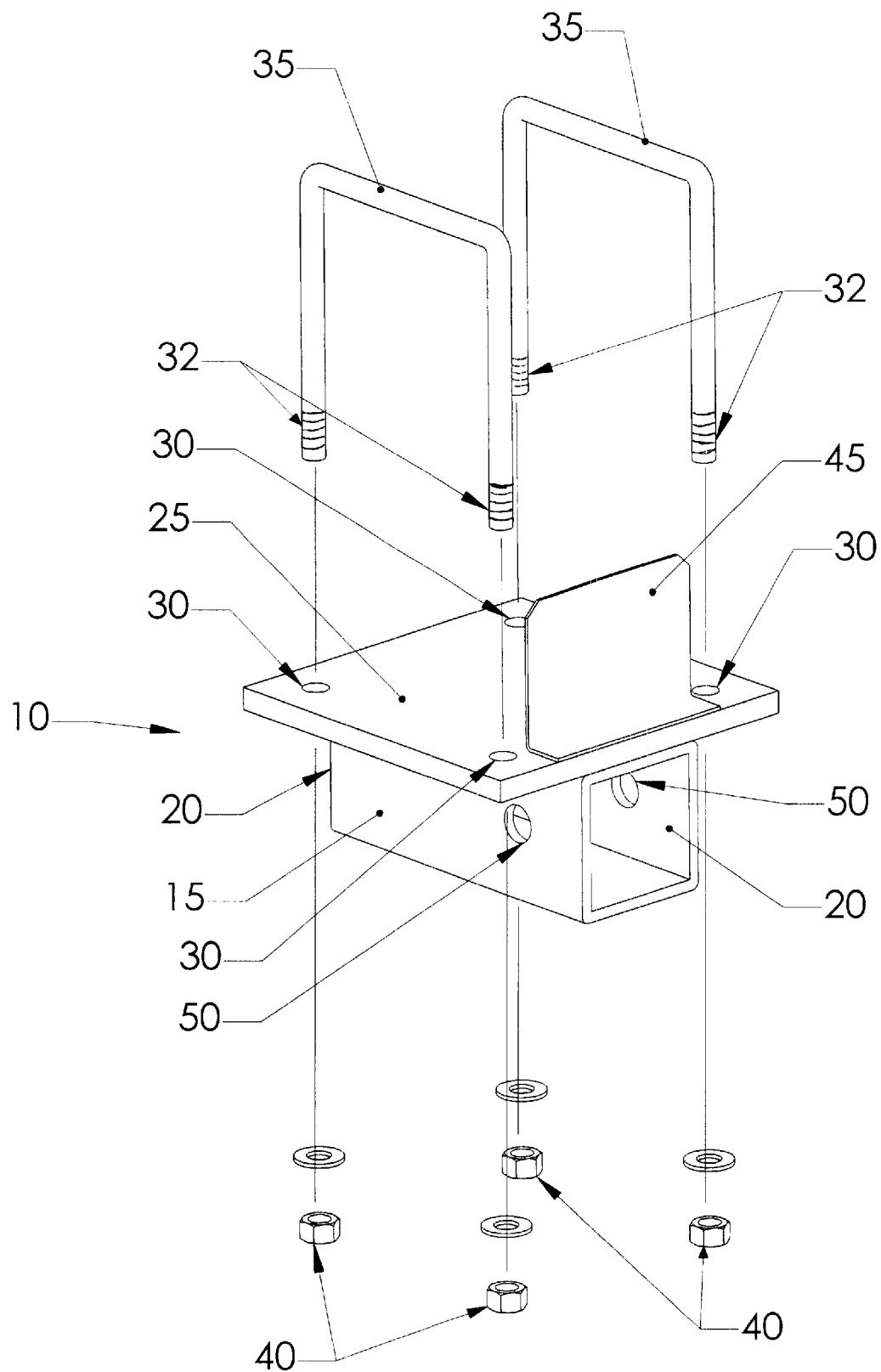
FIG. 2 is a perspective elevational partially exploded view of the receiver bracket device of the present invention.

Referring to FIGS. 1 and 2, the receiver bracket device 10 of the present invention is shown. The receiver bracket device 10 includes a length of two-inch linear square tubing receiver member with open ends 20, secured on one side to one side of a flat plate member 25, with the plate member 25 wider than the square tubing receiver member 15. Preferably, the flat plate member 25 extended only from a first open end 20 of the linear receiver member to a second open end 20 of the linear receiver member 15. The square tubing receiver member 15 has a pair of aligned apertures 50, with one aperture through each receiver member side adjacent the side secured to the flat plate member 25, for pinning an inserted accessory portion. The aligned apertures 50 preferably are positioned near one end of the tubing receiver member 15.

Figure 3:
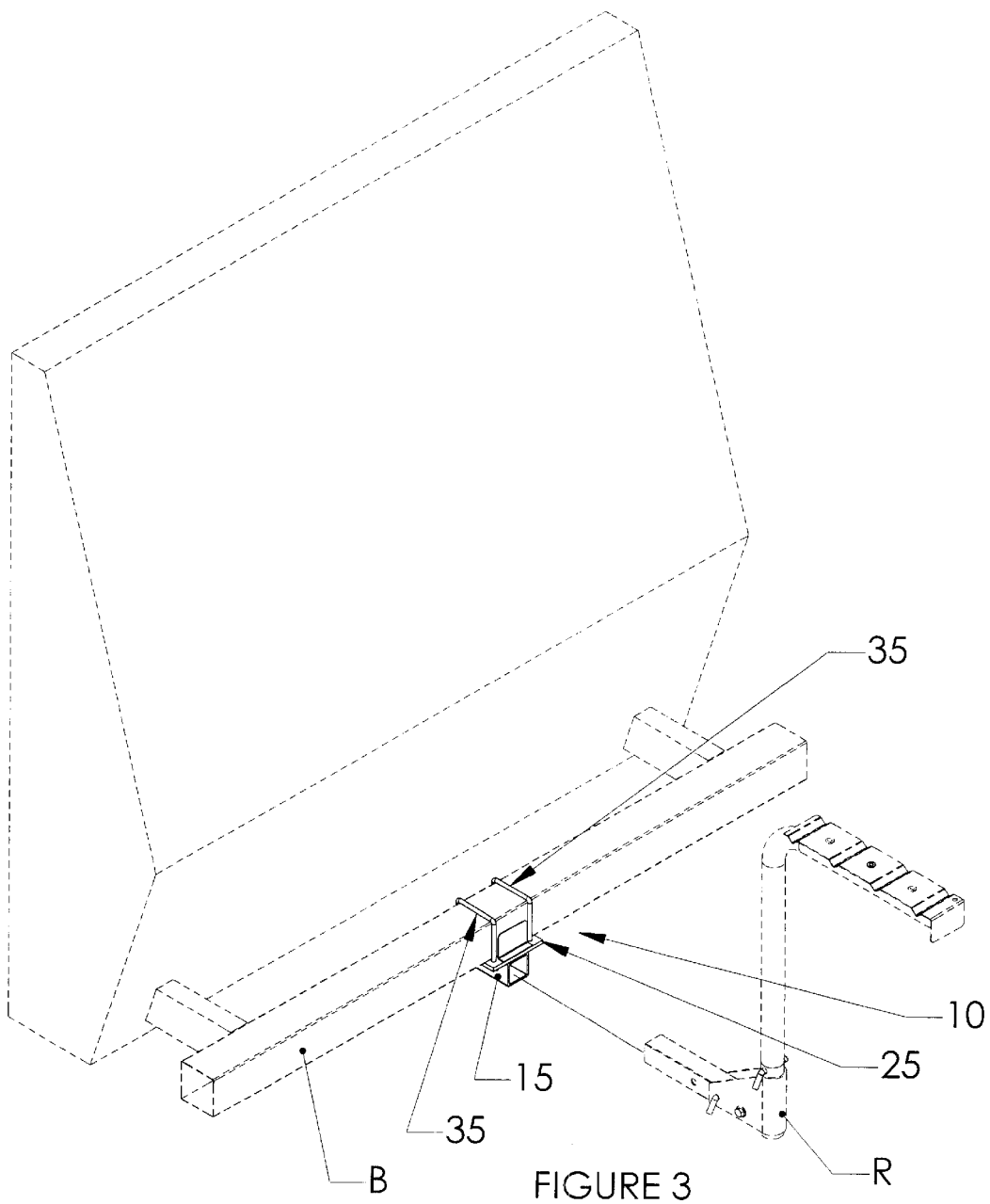
FIG. 3 is a perspective elevational view of the receiver bracket device of the present invention attached to a vehicle bumper for receiving a carrier frame device.
Figure 4:
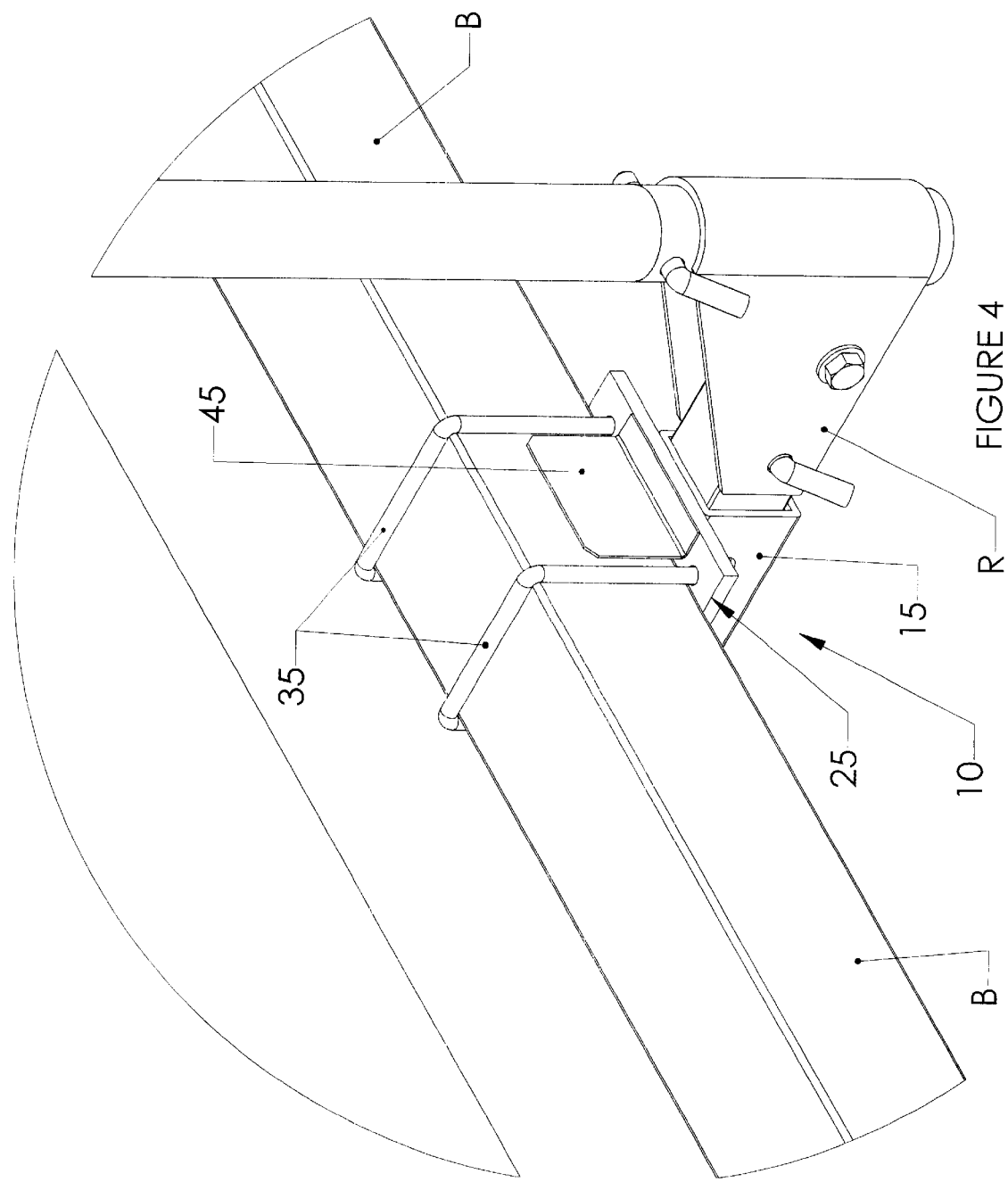
FIG. 4 is a perspective elevational view of the receiver bracket device of the present invention secured to a vehicle bumper and supporting a carrier frame device

The flat plate member 25 has pairs of spaced apart apertures 30, with one aperture pair 30 on each side of the square tubing receiver member 15, as shown in FIG. 2. Each pair of apertures 30 is sized to accept the threaded ends 32 of a U-shaped rod members 35. The U-shaped rod members 35 secure the receiver bracket device 10 to a rectangular bumper B by encircling the bumper B and tightening the threaded fasteners 40 on the two threaded end rod members 35, as shown in FIGS. 3 and 4.

An L-shaped plate member 45 is fastened on one flat leg surface to the flat plate member surface 25 opposite the square tubing receiver member 15, between the pairs of apertures 30, and near one edge of the plate member 25, with the free leg of the L-shaped plate 45 perpendicular to the flat plate member 25, and with the free leg portion contacting the bumper B. The L-shaped plate 45 assists in positioning the receiver bracket device 10 while attaching it to the vehicle bumper B.

Figure 5:
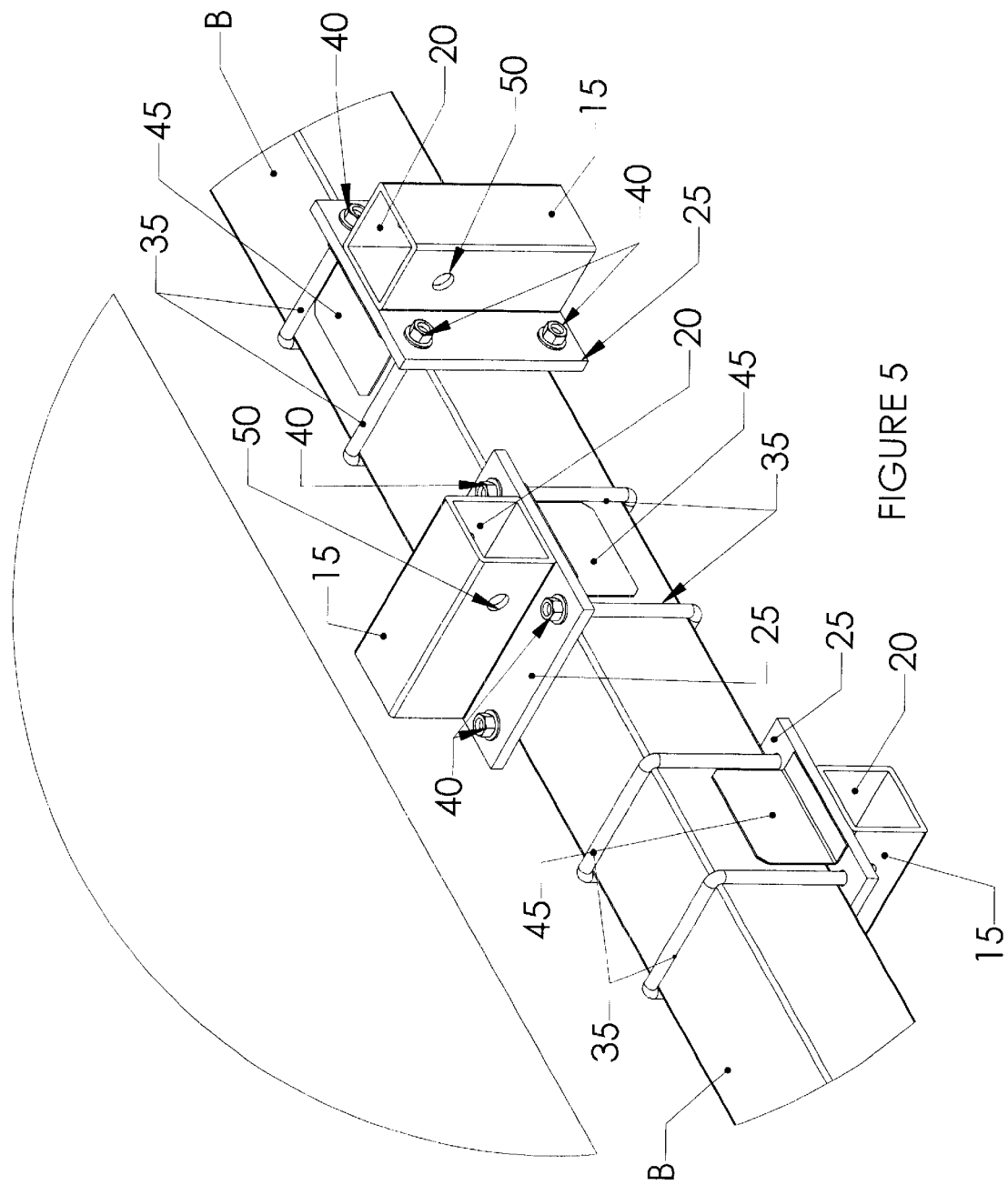
FIG. 5 is a perspective elevational view of the receiver bracket device of the present invention secured to a vehicle bumper in various orientations.

The receiver bracket device 10 is highly symmetrical, allowing mounting of the square receiver tubing member 15 either below or above the supporting bumper B and in a horizontal orientation. Alternatively, the receiving bracket device 10 can be mounted to the bumper with the square tubing member 15 in a vertical orientation. The three orientations of the receiver bracket device 10 secured to a vehicle bumper B are illustrated in FIG. 5.

The receiver bracket device 10 is preferably fabricated from steel alloy material for strength and durability. As illustrated in FIG. 3, the receiver bracket device 10 is designed for attachment to a rectangular or square bumper B that is commonly present on recreational vehicles. The square tubing receiver member 15 accepts and secures one end of a carrier rack device R used for storage or transporting light weight items such as bicycles, moped, etc. The carrier rack device R engaged in the square tubing receiver member 15 of the receiver bracket device 10 is shown in FIG. 4, where the square receiver tubing member 15 is positioned below the vehicle bumper B. The receiver bracket device 10 can, of course, be mounted with the square receiver tubing member 15 positioned above the vehicle bumper B to elevate the position of the carrier rack device R. Similarly, the receiver bracket device 10 can be mounted with the square receiver tubing member 15 in a vertical orientation, as shown in FIG. 5, and a suitably configured carrier rack device R secured by the vertical square receiver tubing member 15 of the receiver bracket device 10. The various orientations of the receiver bracket device 10 on a vehicle bumper B, illustrated in FIG. 5, indicate the versatility of the receiver bracket device 10 for fastening a variety of carrier rack devices R to the vehicle.

While the invention has been particularly shown and described with reference to preferred embodiments thereof, it will be understood by those skilled in the art that various changes in form and details may be made therein without departing from the spirit and scope of the invention.

I claim:

1. A multiposition receiver bracket device for mounting to a vehicle bumper comprising:

a linear, square tubing receiver member with open ends secured on one side to a flat plate member, the plate member extending beyond each side of the tubing receiver member, the plate member having pairs of spaced apart apertures there through, one aperture pair positioned beyond each side of the tubing receiver member;

a pair of U-shaped rod members, each rod member with two threaded ends, the rod members adapted for encircling a square bumper with the threaded ends of each rod member inserted through one pair of flat plate member apertures;

threaded fasteners secured to each rod member threaded end for holding the flat plate member side opposite the receiver member against the square bumper; and an L-shaped plate member fastened on one flat leg surface to the flat plate member surface opposite the tubing receiver member, the L-shaped plate member positioned between the pairs of apertures near one edge of the plate member, with a free leg portion of the L-shaped plate member perpendicular to the flat plate member and in opposition to the square tubing receiver member, the free leg portion contacting the encircled vehicle bumper.

2. The multiposition receiver bracket device according to claim 1, wherein the flat plate member extends from a first open end of the linear receiver member to a second open end of the linear receiver member.

3. The multiposition receiver bracket device according to claim 1, wherein the receiver member, the plate member and the threaded rod members and threaded fasteners are fabricated from steel alloy.

4. The multiposition receiver bracket device according to claim 1, further including a pair of aligned apertures, one aperture through each receiver member side adjacent the side secured to the flat plate member, the aligned apertures for pinning an insert within the receiver member.

5. The multiposition receiver bracket device according to claim 4, wherein the aligned apertures are positioned adjacent one end of the receiver member.

6. A multiposition receiver bracket device for mounting to a vehicle bumper comprising:

a linear, square tubing receiver member with open ends secured on one side to a flat plate member, the flat plate member extending from a first open end of the linear receiver member to a second open end of the linear receiver member, the plate member extending beyond each side of the tubing receiver member, the plate member having pairs of spaced apart apertures there through, one aperture pair positioned beyond each side of the tubing receiver member;

a pair of U-shaped rod members, each rod member with two threaded ends, the rod members adapted for encircling a square bumper with the threaded ends of each rod member inserted through one pair of flat plate member apertures;

threaded fasteners secured to each rod member threaded end for holding the flat plate member side opposite the receiver member against the square bumper;

a pair of aligned apertures in the receiver member, one aperture through each receiver member side adjacent the side secured to the flat plate member, the aligned apertures for pinning an insert within the receiver member; and an L-shaped plate member fastened on one flat leg surface to the flat plate member surface opposite the tubing receiver member, the L-shaped plate member positioned between the pairs of apertures near one edge of the plate member, with a free leg portion of the L-shaped plate member perpendicular to the flat plate member and in opposition to the square tubing receiver member, the free leg portion contacting the encircled vehicle bumper.

7. The multiposition receiver bracket device according to claim 6, wherein the aligned apertures are positioned adjacent one end of the receiver member.

8. The multiposition receiver bracket device according to claim 6, wherein the receiver member, the plate member and the threaded rod members and threaded fasteners are fabricated from steel alloy.

9. A multiposition receiver bracket device for mounting to a vehicle bumper comprising:

a linear, square tubing receiver member with open ends secured on one side to a flat plate member, the flat plate member extending from a first open end of the linear receiver member to a second open end of the linear receiver member, the plate member extending beyond each side of the tubing receiver member, the plate member having pairs of spaced apart apertures there through, one aperture pair positioned beyond each side of the tubing receiver member;

a pair of U-shaped rod members, each rod member with two threaded ends, the rod members adapted for encircling a square bumper with the threaded ends of each rod member inserted through one pair of flat plate member apertures;

threaded fasteners secured to each rod member threaded end for holding the flat plate member side opposite the receiver member against the square bumper;

a pair of aligned apertures positioned adjacent one end of the receiver member, one aperture through each receiver member side adjacent the side secured to the flat plate member, the aligned apertures for pinning an insert within the receiver member; and an L-shaped plate member fastened on one flat leg surface to the flat plate member surface opposite the tubing receiver member, the L-shaped plate member positioned between the pairs of apertures near one edge of the plate member, with a free leg portion of the L-shaped plate member perpendicular to the flat plate member and in opposition to the square tubing receiver member, the free leg portion contacting the encircled vehicle bumper.

10. The multiposition receiver bracket device according to claim 9, wherein the receiver member, the plate member, the L-shaped plate member, and the threaded rod members and threaded fasteners are fabricated from steel alloy.

* * * * *